US006527520B2

(12) United States Patent
Rosefsky

(10) Patent No.: US 6,527,520 B2
(45) Date of Patent: Mar. 4, 2003

(54) RIBBON DRIVE PUMPING WITH CENTRIFUGAL CONTAMINANT REMOVAL

(76) Inventor: Jonathan B. Rosefsky, 251 W. Montgomery Ave., Haverford, PA (US) 19041

(*) Notice: Subject to any disclaimer, the term of this patent is extended or adjusted under 35 U.S.C. 154(b) by 0 days.

(21) Appl. No.: 10/056,869

(22) Filed: Jan. 25, 2002

(65) Prior Publication Data

US 2002/0064465 A1 May 30, 2002

Related U.S. Application Data

(63) Continuation-in-part of application No. 09/628,787, filed on Jul. 29, 2000, now Pat. No. 6,357,998
(60) Provisional application No. 60/146,122, filed on Jul. 29, 1999.

(51) Int. Cl.[7] .............................. F04D 25/16; F04B 17/00
(52) U.S. Cl. ...................... 417/53; 417/423.9; 417/434; 417/313; 415/66; 415/72; 415/75; 415/131; 416/176
(58) Field of Search .............................. 415/66, 71, 72, 415/73, 75, 129, 130, 131, 908, 128, 176, 177; 417/313, 423.9, 434, 53

(56) References Cited

U.S. PATENT DOCUMENTS

| 119,155 A | | 9/1871 | Kolb | |
|---|---|---|---|---|
| 475,826 A | * | 5/1892 | Street | 415/72 |
| 1,549,608 A | | 8/1925 | Raynes | |
| 2,275,428 A | * | 3/1942 | Haldeman | 415/72 |
| 2,568,903 A | | 9/1951 | Vassar | |
| 2,656,809 A | | 10/1953 | Frasure | |
| 3,070,061 A | | 12/1962 | Rightmyer | |
| 3,141,439 A | | 7/1964 | Liston | |
| 3,299,821 A | | 1/1967 | Silvern | |
| 3,441,088 A | * | 4/1969 | Levy | 415/74 |

(List continued on next page.)

FOREIGN PATENT DOCUMENTS

| DE | 298 12 429 | 7/1999 |
|---|---|---|
| EP | 0 480 501 A1 | 9/1991 |
| FR | 467393 | 2/1947 |
| FR | 2 749 558 | 12/1997 |
| JP | 5-294282 | 5/1993 |
| JP | 6-191482 | 6/1994 |
| WO | WO 87/01353 | 12/1987 |
| WO | WO 95/23088 | 8/1995 |

*Primary Examiner*—Cheryl J. Tyler
(74) *Attorney, Agent, or Firm*—Roberts Abokhair & Mardula, LLC

(57) ABSTRACT

A ribbon drive pumping apparatus and method for liquids is disclosed wherein the inherent centrifugal separation that occurs adjacent the pump inlet is used to remove contaminants. The pump has an extended tube having an intake at a first end and an outlet at a second end. A ribbon formed of helical coils is mounted in the tube for rotation and the frequency of the coils decreases from the first end to the second end of the tube. Liquid is collected at the first end, contaminants are centrifugally separated and sorbed or bled off, an axial component of velocity of the liquid is increased via the rotating ribbon, and the purified liquid is ejected from the second end to provide pumping of the liquid. A central opening helps decrease cavitation and can be useful for pumping live fish.

19 Claims, 4 Drawing Sheets

U.S. PATENT DOCUMENTS

| | | | |
|---|---|---|---|
| 3,482,402 A | | 12/1969 | Anthoney, Sr. |
| 3,737,249 A | | 6/1973 | Cooper |
| 3,796,508 A | * | 3/1974 | Rowley ................. 415/72 |
| 3,807,708 A | * | 4/1974 | Jones .................. 415/72 |
| 3,976,453 A | * | 8/1976 | Brown .................. 415/72 |
| 4,145,289 A | * | 3/1979 | Seroussi ............ 417/423.9 |
| 4,373,919 A | | 2/1983 | Stangeland |
| 4,426,190 A | * | 1/1984 | Shapiro et al. ........... 415/74 |
| 4,496,282 A | | 1/1985 | Gokhman |
| 4,634,389 A | | 1/1987 | Eptaminitakis |
| 5,181,868 A | | 1/1993 | Gabriel |
| 5,240,374 A | | 8/1993 | Speer |
| 5,244,425 A | | 9/1993 | Tasaki et al. |
| 5,292,270 A | | 3/1994 | Tucker et al. |
| 5,324,216 A | | 6/1994 | Toyohara et al. |
| 5,383,802 A | | 1/1995 | Nicholson |
| 5,417,597 A | | 5/1995 | Levedahl |
| 5,558,509 A | | 9/1996 | Jirnov et al. |
| 6,013,140 A | | 1/2000 | Simoneaux |
| 6,357,998 B1 | * | 3/2002 | Rosefsky ................. 415/66 |

* cited by examiner

RIBBON DRIVE PUMPING WITH CENTRIFUGAL CONTAMINANT REMOVAL

RELATIONSHIP TO PRIOR APPLICATIONS

This application is a continuation-in-part of U.S. application Ser. No. 09/628,787, filed Jul. 29, 2000, now U.S. Pat. No. 6,357,998, which claims the benefit of U.S. Provisional Application No. 60/146,122, filed Jul. 29, 1999, both of which are incorporated herein by reference.

FIELD OF THE INVENTION

This invention relates generally to improvements to leverage the inherent separation capabilities of ribbon drive pumping apparatus to allow contaminant removal using a ribbon drive mechanism. More particularly, the present invention is a ribbon drive shaped as a spiral ribbon along the interior wall of a tubular conduit for causing water or other liquids to be pumped through the apparatus. A sorbent or bleed valve is located in the high frequency portion of the ribbon adjacent the pump inlet for contaminant removal.

BACKGROUND OF THE INVENTION

Pumped liquids often include contaminants that require removal to prevent adverse effects such as blockage, hazardous conditions (fire, explosion, poison, etc.), corrosion, impeller pitting, etc. For example, pumped petroleum products are often contaminated with water and cryogenic liquids are often contaminated with hydrogen.

The prior art usually addresses these contaminants by either providing separate separation systems or by providing in-line filtering. However, separate separation systems can be costly and complicated and in-line filters can cause undesirable pressure drops and can become clogged.

Therefore, what would be useful would be a pumping system capable of overcoming these limitations by having an integral contaminant removal means.

The present invention is just such a system that differs significantly from the inventions discussed above. The present invention generally comprises a ribbon drive with a high frequency coil at the intake end at point A with the frequency decreasing along the length of the tube to point B, wherein a sorbent and/or bleed valve is located within the ribbon drive proximate the intake to leverage the ribbon drive's inherent separation capabilities.

BRIEF SUMMARY OF THE INVENTION

As discussed more fully below, the ribbon drive pumping apparatus consists of a ribbon-like curved shape composed of metal or other suitable material. The ribbon can be of a "central design" wherein it is attached at an inner edge to a rotating central shaft and an outer edge extends nearly to a fixed containment tube, leaving a small clearance to allow rotation. The ribbon can also be of a "peripheral design" wherein an outer edge is attached to the interior periphery of a spinning containment tube or a series of peripheral rings rotating within a fixed cylindrical containment tube, said spinning or fixed containment tube and said rings having a constant diameter for the length of the containment tube. A sorbent and/or bleed valve is located within the ribbon drive proximate the intake, where contaminants can be centrifugally separated from the primary pumped liquid.

It is an object of the present invention to create a pumping apparatus providing contaminant removal with significantly decreased outlays of capital for facilities construction compared to that presently required.

It is a further object of the present invention to create a pumping apparatus with integral contaminant separation.

It is a further object of the present invention to create a pumping apparatus that can remove contaminants without pressure loss.

It is yet another object of the present invention to provide a system and method useful for removing contaminants from cryogenic liquids (i.e., $H_2$ or noble gases from liquid nitrogen, liquid oxygen, etc.) and liquid petroleum products (i.e., water from crude oil, LNG, etc.).

It is another object of the invention to provide a quiet and efficient pump due to both reduced cavitation and improved gas removal.

It is another object of the present invention in a peripheral design embodiment to allow the pumping of large "contaminants" such as live fish.

The ribbon drive pumping apparatus of the present invention consists of a ribbon-like curved shape, composed of metal or other suitable material, as disclosed in co-pending application Ser. No. 09/628,787, now U.S. Pat. No. 6,357,998.

A key element of the present invention is that there is a change in the frequency of curves of the ribbon drive, which proceeds from a high frequency (many coils per unit length) at the leading portion of the apparatus to a low frequency (few coils per unit length) at the trailing portion of the apparatus. The apparatus has an increasingly stretched frequency of coils as one proceeds down the length of the interior periphery of the containment tube. For example, in appearance, at the intake point for the water at point A, the apparatus would present a tightly curved angle for the coil, with said angle being nearly vertical to the intake of water passing through the apparatus and changing/progressing to a much more gradual curve at an angle that might approximate 30 degrees to the horizontal at the discharge point of the containment tube at point B.

The initial tight curves (the high frequency front entry section of the coil) provide centrifugal separation of material being pumped within the forward portion of the containment tube based on the density differences.

DETAILED DESCRIPTION OF THE INVENTION

Figure 1A:
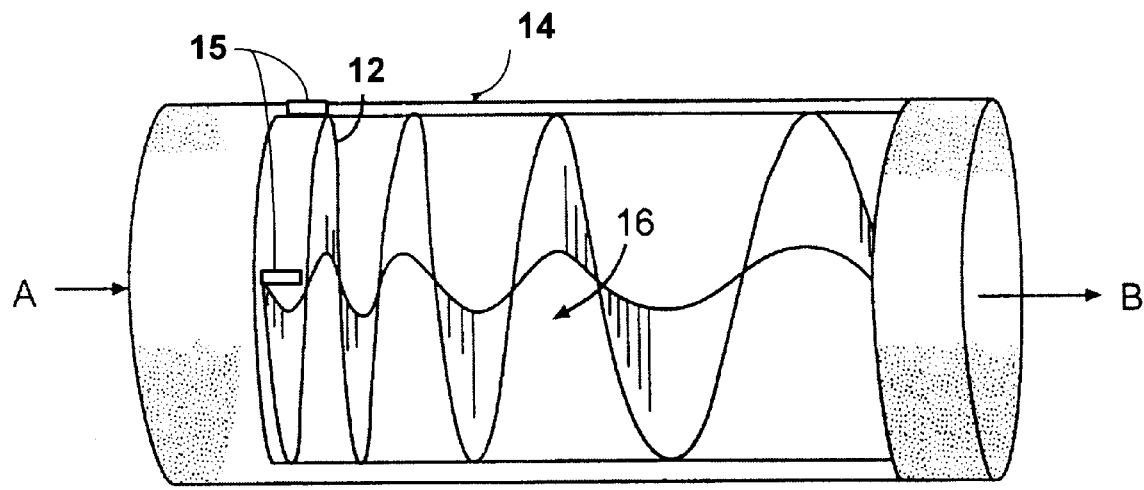
FIGS. 1A–1B illustrate the peripheral design of the pump apparatus.

Referring to FIG. 1A, the peripheral design is illustrated. The ribbon drive pumping apparatus consists of a ribbon-like curved shape vane 12, composed of metal or other suitable material, attached to the interior periphery of a spinning containment tube 14 or a series of peripheral rings having a constant diameter for the length of the containment tube. Water or other fluid flows through the pumping apparatus in the direction of the arrow as the entire containment tube rotates or spins, thus turning the attached ribbon drive vane. If the ribbon or vane 12 does not extend to the axis, an open central core 16 is formed. Contaminant removal means 15 is located in the pump proximate the inlet.

Figure 1B:
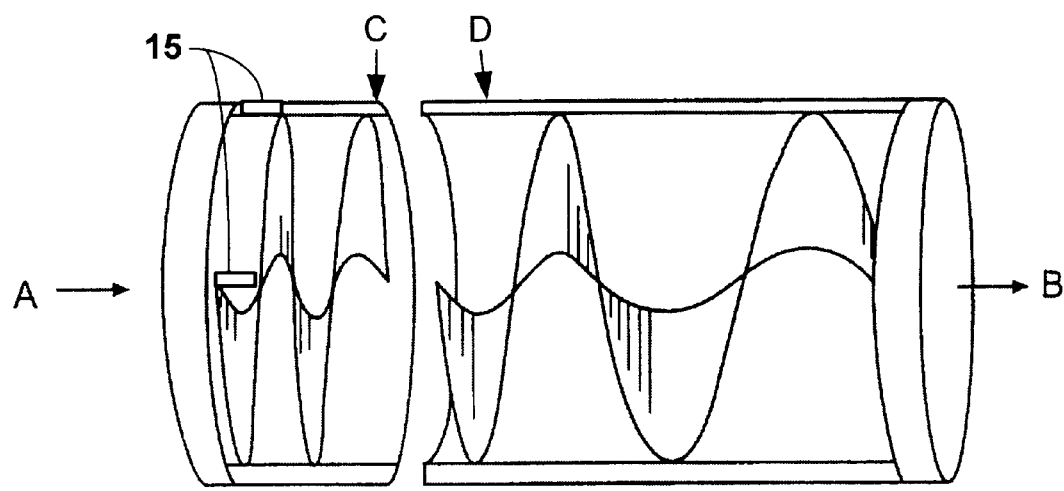

The containment tube with attached vane can be divided into 2 or more sections C, D, as illustrated in FIG. 1B, each being rotated at different rates optimized for final fluid output volume and velocity.

Water or other fluid initially enters the containment tube at point A and initially is propelled down the tube up to a speed limited by virtue of the high frequency of the coil section located at the leading edge portion of the containment tube. However, to accept each initial unit volume of water which has been sped up by the initial high frequency coil, the frequency of the subsequent coil and the associated helix angle of the ribbon/vane decreases, thereby imparting additional velocity to the water as it exits from the tube at point B.

The ribbon drive method/process becomes clearer when considering that if an accelerated unit volume of water were moving at, e.g., 10 feet/second, and contacted a subsequent coil of the same frequency/angle/tightness of curve, that coil would act to inhibit the flow of accelerated water unless that subsequent coil were turning at an even higher number of revolutions per minute to accommodate the increased velocity imparted to exiting water by the preceding coil. However, being within the same spinning containment tube turning at the same rate, e.g., 400 RPM, the second coil cannot rotate at a higher RPM. On the other hand, if the second coil has a lower frequency than the first coil, it will transfer additional energy to the already accelerated unit volume of water, resulting in an exit velocity after the second coil of, say, 12 or 14 feet/second. Thus the frequency/angle/tightness of curve of the subsequent sections decreases, thereby imparting additional velocity to the water as it exits from the tube at point B.

The frequency of each coil and the distance between the coils can be optimized by design, whether fixed in the same containment tube or not. If subsequent coils of lower frequency are rotated in separate sections at separate RPM's, additional energy savings and increases in velocity and volume can be attained by allowing the rotation rates of subsequent sections to be tailored for optimum or maximum performance.

Within the containment tube, the central core 16 is open to water flow from the entry point. This unobstructed central flow of water accommodates the need for additional water to fill the virtual space vacated by water so as to reduce shear forces and inhibit cavitation (and the noise resulting from cavitation).

The essential element of design of the present invention is the ribbon drive whose curve changes from a high frequency of coils per unit length to a low frequency of coils per unit length as one moves or progresses from the intake end to the output end of the containment tube. From an appearance standpoint, the ribbon drive would, at the intake point A of the apparatus, be comprised of a series of tight curves of the ribbon drive having an angle very nearly close to vertical at the intake point of the containment tube with a gradual curve as one progresses from the intake end to the output end or discharge point of the containment tube with an angle at the output end of the containment tube that might approximate 30 degrees.

The tight helix of the ribbon drive, i.e., high frequency of coils per unit length, initially brings water or other fluid into the containment tube. As the accelerated water or other fluid proceeds to the lower frequency curve of the already spinning helix, the axial water velocity speeds up sequentially. It is within this tight helix portion of the ribbon drive that the inherent centrifugal separation of contaminants is greatest, such that this is the best location for a separation means 15 for removal or capture of separated contaminants.

Coil frequencies and axial lengths can be optimized. Coils, divided into separate sections and arranged in series, can also be rotated at different RPM's (by separate drive means) to achieve optimal output.

The containment tube could be spun or rotated by any of a number of means of power. Power could be transmitted to the containment tube of the pumping apparatus from the means of power by the use of gears, pulleys, or any of a variety of combinations of techniques including magnetic attraction/repulsion methods. When pumping cryogens, a drive and bearing system with superconducting magnets could be used which takes advantage of the cryogen temperatures.

The pumping apparatus could be employed in a variety of sizes based on the particular space or configuration restrictions of the area(s) in which it would be employed.

In an alternate embodiment, where the "contaminant" is a large object, such as a live fish, which is desired to have minimal or no contact with the ribbon, the peripheral design ribbon drive pump can be used without means 15 since the central core 16 inherently provides a means for the fish to be removed with minimal or no contact with the vane 12. As such, the present invention includes a method of pumping live fish, such as for allowing spawning fish to get upstream of dams.

Figure 2:
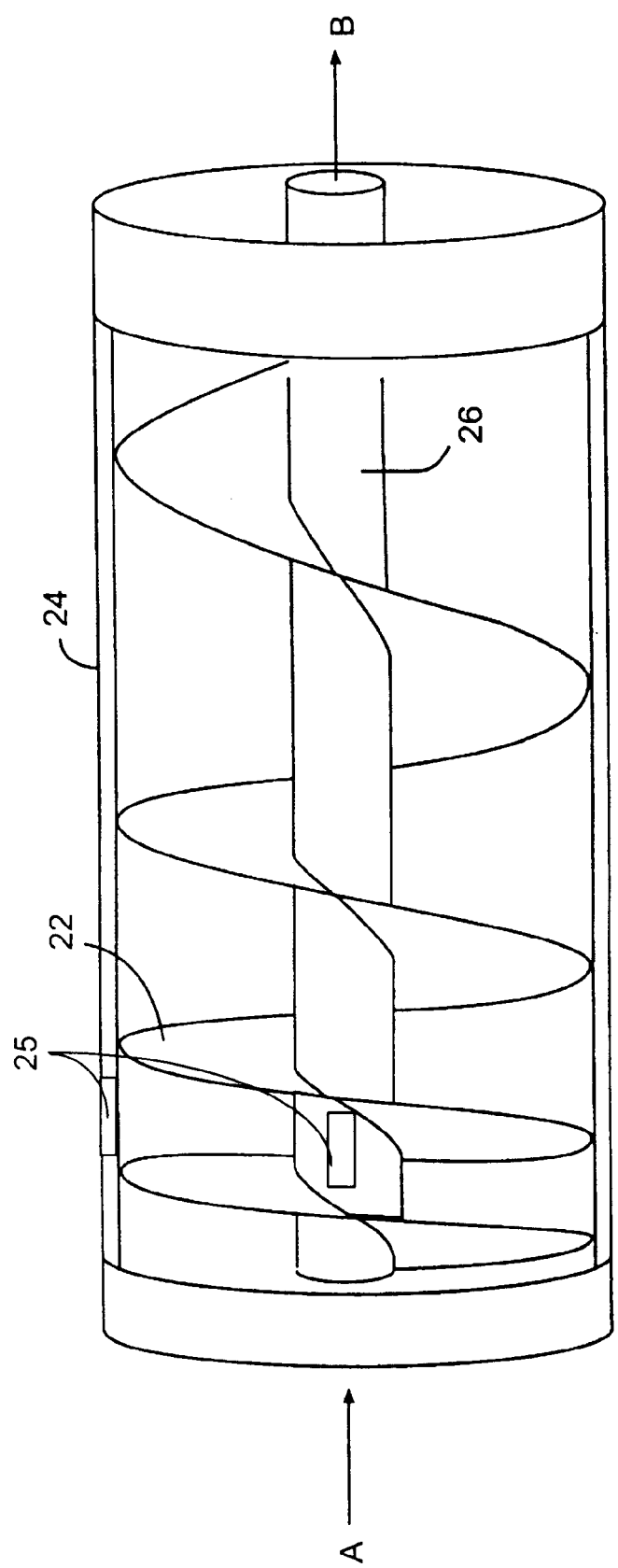
FIGS. 2 and 5 illustrate the central design of the pump apparatus.

FIG. 2 illustrates an alternative embodiment wherein the coils of the ribbon vane 22 are attached to a central shaft 26 and the containment tube 24 remains stationary. Rotation of ribbon vane 22 produces similar pumping effects, but without the same level of shear force reduction and cavitation reduction found in the peripheral design described above. The central shaft design and stationary containment tube may utilize slip stream channels or a hollow central axle core perforated for additional water passage, either of which extra water sources may supply additional water to internal areas having significant negative pressure.

Figure 5:
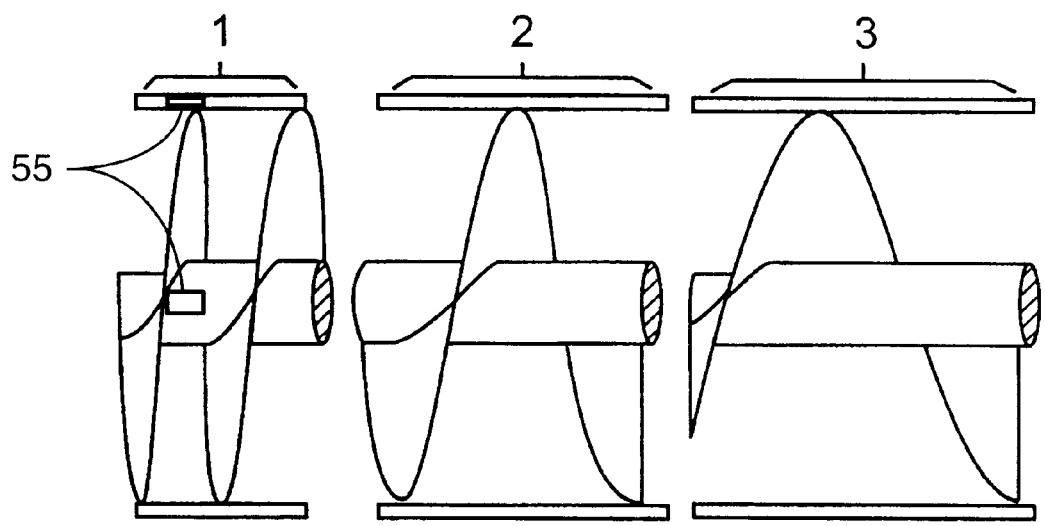

FIG. 5 illustrates a multi-section embodiment of the central design pump of FIG. 2 in which contaminant removal means 55 are located in the first section having the higher frequency coils so as to take advantage of the increased centrifugal separation in this section.

The curved ribbon-like vane may be made of metal, plastic, composite or other sturdy material.

Figure 3:
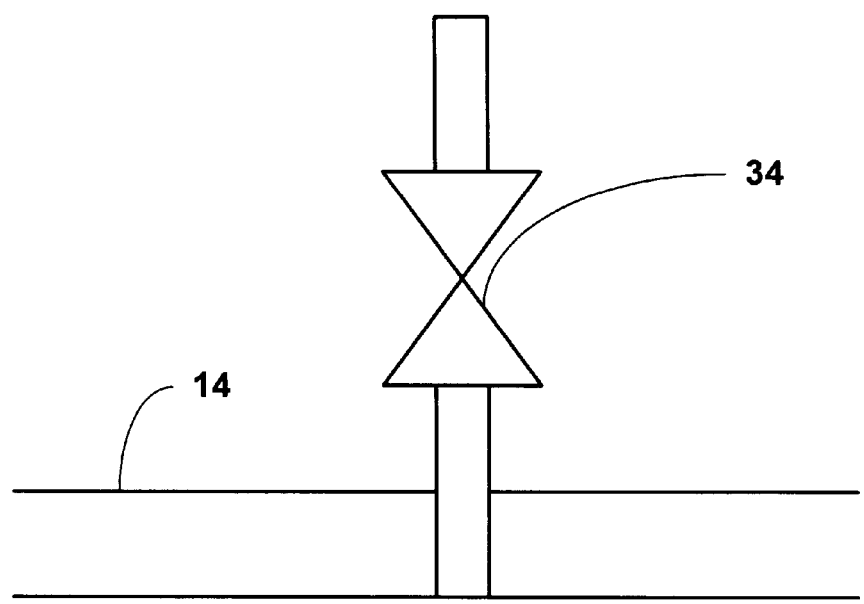
FIG. 3 illustrates a bleed valve of the present invention.

Referring to FIG. 3, a bleed valve implementation of the contaminant removal means for the ribbon drive pumping system of the present invention is illustrated. Bleed valve 34 is illustrated schematically as having an inlet that extends to the inside of tube 14 for collection and removal of contaminants.

Figure 4:
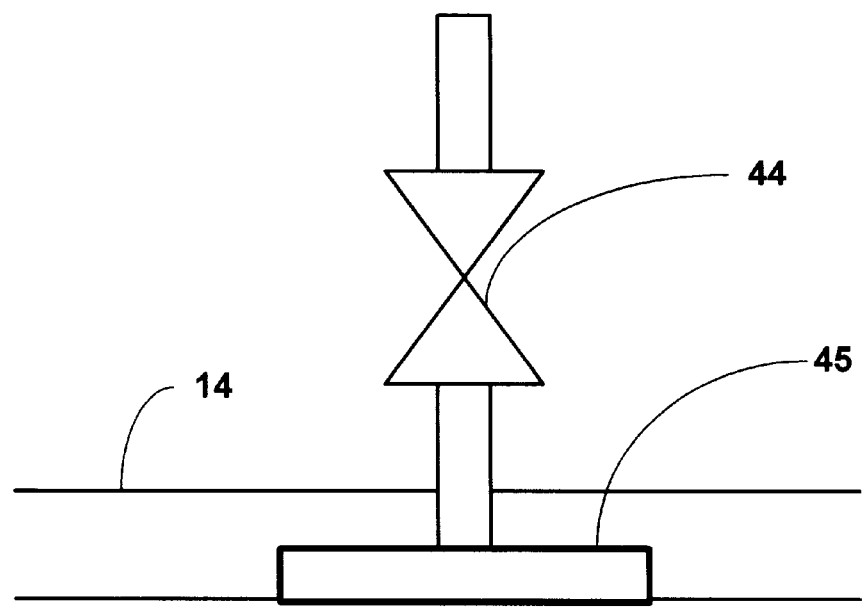
FIG. 4 illustrates a sorbent and regeneration valve of the present invention.

A similar arrangement is illustrated in FIG. 4. In this figure, the contaminant removal means for the ribbon drive pumping system of the present invention includes a sorbent 45 within the tube 14 for collection and removal of contaminants and a purge or exhaust valve 44 for regeneration of the sorbent 45.

Although disclosed herein with respect to specific embodiments, numerous modifications are also possible without departing from the scope of the present invention, such as sorbent pads that are replaceable from the exterior of the pump via an opening in the tube wall or a mesh inlet funnel and screen at the periphery of the hollow central core for preventing ribbon contact with fish. As such, the scope of the invention is limited only by the claims appended below.

What is claimed is:

1. A pumping apparatus for liquids comprising:
   a tube having an inner surface, an intake at a first end, and an outlet at a second end;
   at least one ribbon having a peripheral edge mounted to said inner surface of said tube, said ribbon being formed of coils extending in a helical manner from the first end to the second end of the tube, wherein a frequency of coils per unit length of tube decreases from the first end to the second end of the tube;
   means for removing contaminants centrifugally separated proximate the first end; and
   drive means for rotating said tube and ribbon so as to pump liquid from said first end to said second end.

2. The pumping apparatus for liquids of claim 1, wherein said means for removing contaminants is selected from the group consisting of peripherally located sorbent, axially located sorbent, a peripherally located bleed valve, an axially located bleed valve, a peripherally located sorbent with regeneration exhaust valve, and an axially located sorbent with regeneration exhaust valve.

3. The pumping apparatus for liquids of claim 1, wherein the ribbon extends radially inward from the tube a length less than a radius of the tube to form a central, axial opening in the ribbon.

4. The pumping apparatus for liquids of claim 1, comprising plural axially connected sections, each section having a separate tube and ribbon with the means for removing contaminants located in a first section.

5. The pumping apparatus for liquids of claim 1, wherein said ribbon is cupped to have a concave curvature in a direction facing the outlet.

6. The pumping apparatus for liquids of claim 1, wherein the ribbon is formed of rigid material selected from the group consisting of metal, composite materials, plastic polymer, and ceramic.

7. A pumping method for liquids comprising:
   providing a tube having an inner wall, an intake at a first end, and an outlet at a second end;
   rotating said tube and at least one ribbon having a peripheral edge mounted to said inner surface of said tube so as to:
      collect liquid at the first end;
      increase an axial component of velocity of the liquid with the rotating ribbon;
      centrifugally separate contaminants proximate the first end; and
      eject liquid from the second end to pump said liquid, and
   removing the centrifugally separated contaminants,
   wherein said ribbon is formed of coils extending in a helical manner from the first end to the second end of the tube, and
   wherein a frequency of coils per unit length of tube decreases from the first end to the second end of the tube.

8. The pumping method for liquids of claim 7, wherein removing the centrifugally separated contaminants is accomplished by a step selected from the group consisting of sorbing at a peripheral location, sorbing at an axial location, bleeding off at a peripheral location, bleeding off at an axial location, sorbing with a regeneratable sorbant at a peripheral location, and sorbing with a regeneratable sorbant at an axial location.

9. The pumping method for liquids of claim 7, wherein the ribbon extends radially inward from the tube a length less than a radius of the tube to form a central, axial opening in the ribbon.

10. The pumping method for liquids of claim 7, comprising providing plural axially connected sections, each section having a separate tube and ribbon and wherein removing contaminants occurs only within a first section.

11. A pumping apparatus for liquids comprising:
    a tube having an intake at a first end and an outlet at a second end;
    an axial shaft inside said tube;
    at least one ribbon having an inner edge mounted to said shaft, said ribbon being formed of coils extending in a helical manner from the first end to the second end of the tube, wherein a frequency of coils per unit length of tube decreases from the first end to the second end of the tube;
    means for removing contaminants centrifugally separated proximate the first end; and
    drive means for rotating said shaft and ribbon so as to pump liquid from said first end to said second end.

12. The pumping apparatus for liquids of claim 11, wherein said means for removing contaminants is selected from the group consisting of peripherally located sorbent, axially located sorbent, a peripherally located bleed valve, an axially located bleed valve, a peripherally located sorbent with regeneration exhaust valve, and an axially located sorbent with regeneration exhaust valve.

13. The pumping apparatus for liquids of claim 11, comprising plural axially connected sections, each section having a separate tube and ribbon, and with the means for removing contaminants located in a first section.

14. The pumping apparatus for liquids of claim 11, wherein said ribbon is cupped to have a concave curvature in a direction facing the outlet.

15. The pumping apparatus for liquids of claim 11, wherein the ribbon is formed of rigid material selected from the group consisting of metal, composite materials, plastic polymer, and ceramic.

16. A pumping method for liquids comprising:
    providing a tube having an intake at a first end and an outlet at a second end;
    rotating an axial shaft within said tube and at least one ribbon having an inner edge mounted to said shaft so as to:
       collect liquid at the first end;
       increase an axial component of velocity of the liquid with the rotating ribbon;
       centrifugally separate contaminants proximate the first end; and
       eject liquid from the second end to pump said liquid, and
    removing the centrifugally separated contaminants,
    wherein said ribbon is formed of coils extending in a helical manner from the first end to the second end of the tube, and
    wherein a frequency of coils per unit length of tube decreases from the first end to the second end of the tube.

17. The pumping method for liquids of claim 16, wherein removing the centrifugally separated contaminants is accomplished by a step selected from the group consisting of sorbing at a peripheral location, sorbing at an axial location, bleeding off at a peripheral location, bleeding off at an axial location, sorbing with a regeneratable sorbant at a peripheral location, and sorbing with a regeneratable sorbant at an axial location.

18. The pumping method for liquids of claim 16, comprising providing plural axially connected sections, each section having a separate tube and ribbon and wherein removing contaminants occurs only within a first section.

19. A method for pumping water containing live fish comprising:
- providing a tube having an inner wall, an intake at a first end, and an outlet at a second end;
- rotating said tube and at least one ribbon having a peripheral edge mounted to said inner surface of said tube so as to:
  - collect water containing live fish at the first end;
  - increase an axial component of velocity of the water with the rotating ribbon;
  - eject water and live fish from the second end,
- wherein said ribbon is formed of coils extending in a helical manner from the first end to the second end of the tube,
  - wherein a frequency of coils per unit length of tube decreases from the first end to the second end of the tube,
  - wherein the ribbon extends radially inward from the tube a length less than a radius of the tube to form a hollow central core in the ribbon, and
  - wherein said fish are transported within said central core to minimize contact with said ribbon.

* * * * *